Dec. 14, 1926.

L. E. LOVEJOY

FLOUR SIFTER

Filed May 5, 1926  2 Sheets-Sheet 1

1,610,300

Inventor

Lillian E. Lovejoy

By Lacey & Lacey, Attorneys

Dec. 14, 1926.                                         1,610,300
                    L. E. LOVEJOY
                    FLOUR SIFTER
              Filed May 5, 1926          2 Sheets-Sheet 2
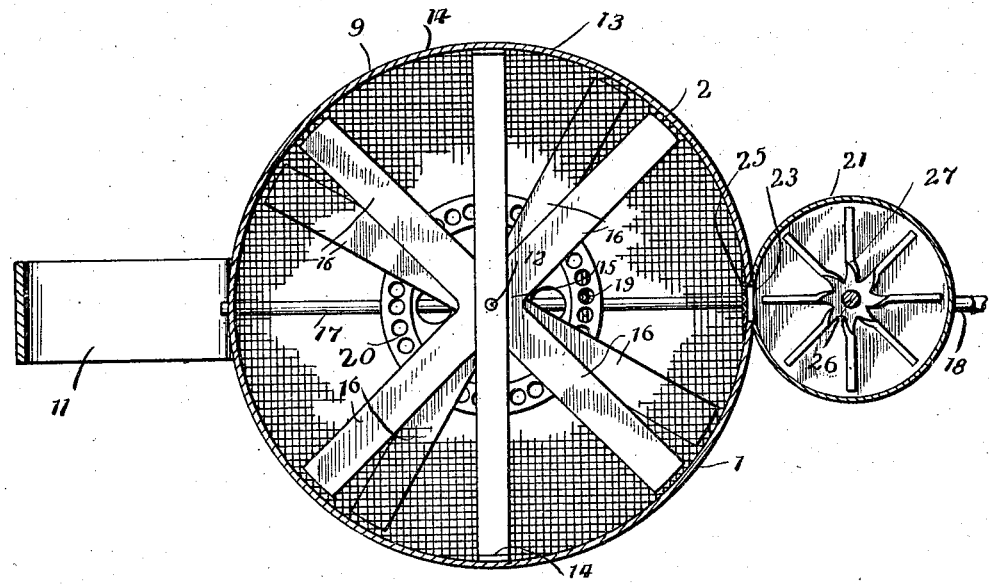
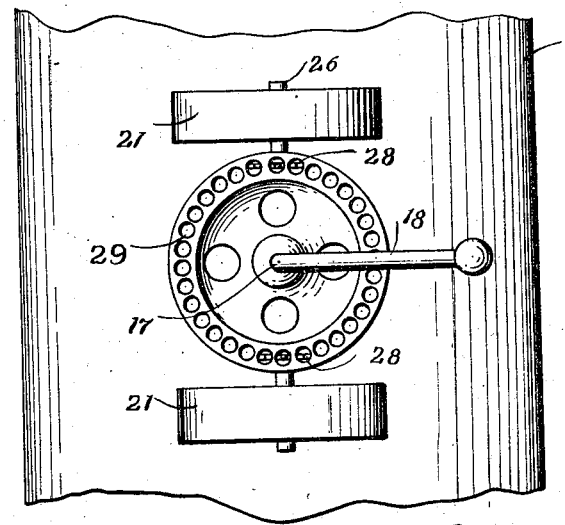
Inventor
Lillian E. Lovejoy
By Lacey & Lacey Attorneys Patented Dec. 14, 1926.

1,610,300

UNITED STATES PATENT OFFICE.

LILLIAN E. LOVEJOY, OF OPPORTUNITY, WASHINGTON.

FLOUR SIFTER.

Application filed May 5, 1926. Serial No. 106,938.

This invention relates to kitchen utensils and more particularly to a flour sifter.

One object of the invention is to provide the sifter with means to thoroughly agitate the flour while it is being sifted.

Another object of the invention is to provide a sifter in which air may be mixed with the flour during the sifting operation and a very light mass of flour produced.

Another object of the invention is to so mount the agitators and air injectors that they may be actuated from a single drive shaft.

Another object of the invention is to so construct the sifter that the flour may be successively operated upon a number of times before being removed.

This invention is illustrated in the accompanying drawings, wherein—

Fig. 2 is a transverse sectional view through the sifter;

Fig. 3 is a view showing a fragment of the sifter in side elevation.

Figure 1:
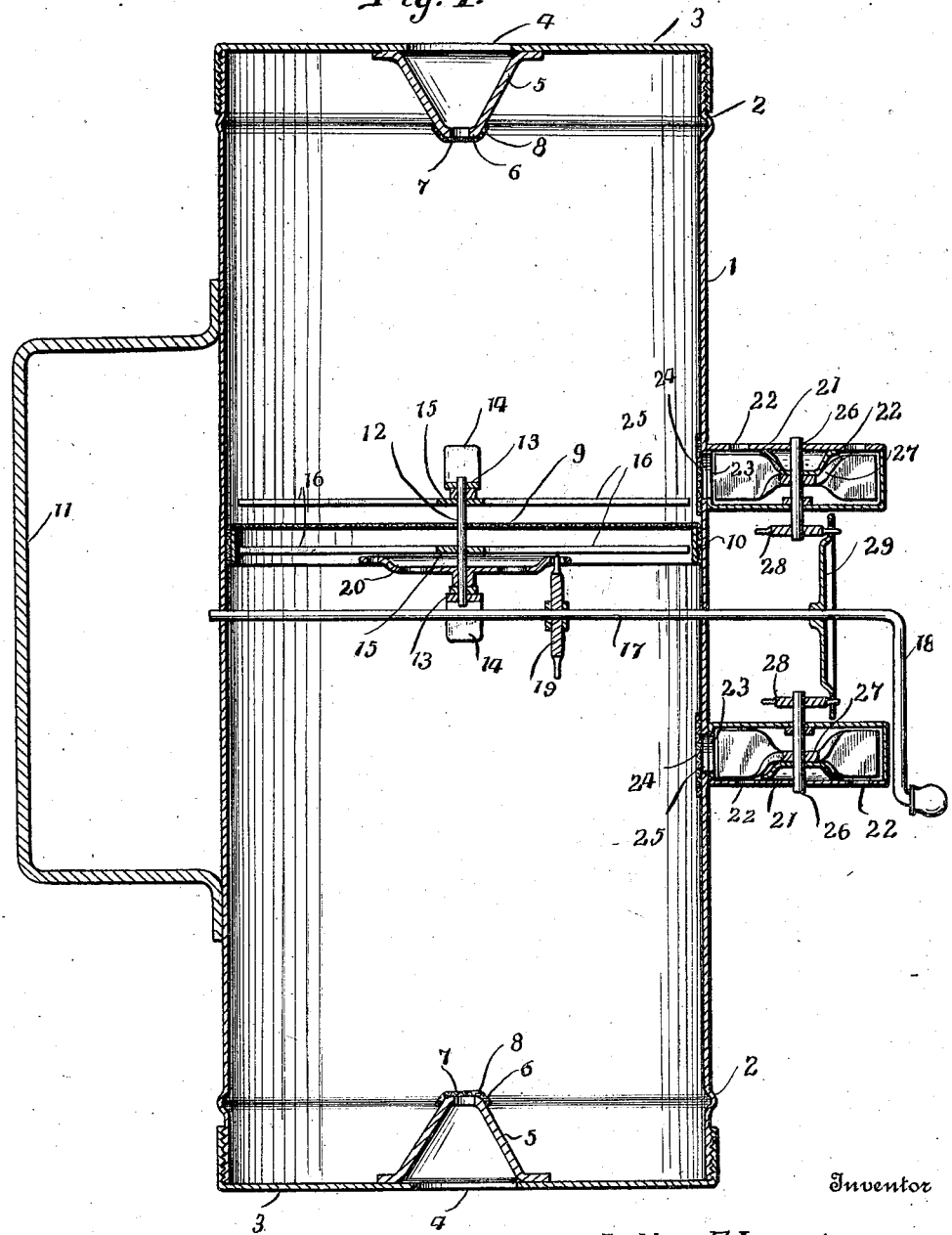
Figure 1 is a vertical sectional view through the improved sifter.

The receptacle or body portion 1 which may be termed a casing if so desired is formed of sheet metal and is cylindrical and open at its ends. Outwardly extending beads 2 are provided adjacent the ends of the receptacle and serve to strengthen the walls and prevent them from being readily bent when the caps 3 are put in place. Each cap is provided with a central opening 4 enclosed by a conical guard 5 which projects inwardly in enclosing relation to the opening and has its apex 6 flattened somewhat and formed with a reduced opening 7 covered by a screen 8 which is soldered or otherwise firmly secured to the guard. A screen 9 which forms a partition is secured in the receptacle or casing intermediate its ends by a ring or band 10 and divides the casing into end compartments, one of which is to contain the flour to be sifted and the other serving to receive the flour as it passes through the screen. A handle 11 is disposed at one side of the casing and extends longitudinally thereof with its arms secured to the casing above and below the screen so that the sifter may be easily lifted and held with either compartment uppermost.

The shaft 12 of the agitator which may be referred to as a driven shaft extends through the screen 9 axially of the casing or receptacle and is journaled in bearing strips 13 which extend diametrically across the casing and at their ends are formed with feet 14 soldered or otherwise secured to its walls. Beaters 15 which are preferably formed of sheet metal and provided with radiating arms 16 are secured upon the agitator shaft above and below the screen so that flour placed in the receptacle or casing may be thoroughly agitated and caused to readily pass through the screen when the sifter is in operation. It will be readily understood that the agitators or beaters will operate with either end of the receptacle uppermost. In order to impart rotary movement to the agitator shaft, there has been provided a driving shaft 17 which extends diametrically through the receptacle and has a portion projecting outwardly therefrom and bent to form a crank handle 18, by means of which it may be readily rotated. A gear 19 is rigidly secured upon the driving shaft within the receptacle and meshes with a gear 20 secured upon the shaft 12 so that, when the driving shaft is rotated, rotary motion will be transmitted to the shaft 12.

When preparing flour to be used for making angel cake and other very light cakes, it is necessary to have the flour thoroughly aerated so that air taken up by the flour will cause the flour to be very light. I have, therefore, provided the sifter with fans, each of which is provided with a housing 21 having air inlet openings 22 formed therein. The fan housings are disposed externally of the casing and secured to the casing wall above and below the screen 9 and formed with outlets 23 which register with inlets 24 cut in the casing wall. Each of the inlet openings 24 is covered by screening, as shown at 25, so that the flour will be prevented from passing through the registering openings into the fan housings. The shafts 26 which rotatably mount the fans 27 disposed in the housings are journaled in the heads of the fan housings and extend axially thereof with portions projecting from the fan housings. Gears 28 are rigidly mounted upon the projected end portions of the shafts 26 and mesh with a large gear 29 carried by the drive shaft 17 so that, when the drive shaft is rotated to impart movement to the agitator shaft 12, rotary motion will also be imparted to the fan shafts and the fans rotated to draw air into the fan housings and force the air through the registering openings 23 and 24 into the compartments of the casing above and below the screen 9.

When the sifter is in use, either one of the caps 3 is removed and the sifter held with the open end of the casing uppermost. The flour to be sifted is poured into the casing and the cap or cover then replaced. After the cap has been replaced, the crank handle 18 is turned to rotate the drive shaft and impart rotary motion to the agitator shaft and fan shafts. The agitators will cause the flour to pass through the screen and the fans will inject air into the casing above and below the screen. This air will serve to lighten the flour as part of it will be taken up by the flour. The surplus air will, of course, pass out through the openings 7 which are protected by the screens 8 so that the flour will not be wasted. After the flour has been passed through the screen from the upper compartment into the lower one, the sifter is inverted and the sifting operation repeated so that the flour is again passed through the screen and additional air mixed with it. This may be repeated any number of times without it being necessary to remove the flour from the sifter. While the flour is being subjected to the final sifting operation, the cap at the lower end of the casing may be removed and the flour allowed to pass directly into a mixing bowl or the caps or the covers may both be left in place until the sifting has been completed and the lower cap then removed and the flour allowed to pass into the mixing bowl.

Having thus described the invention, I claim:

1. A sifter comprising a container, a screen in said container, agitators in said container above and below said screen, and means for injecting air into the container above and below said screen.

2. A sifter comprising a container, a screen in said container, agitators in said container above and below said screen, means for injecting air into the container above and below said screen, and common means for actuating said agitators and air-injecting means.

3. A sifter comprising an open-ended body, closures for the open ends of said body each formed with an air outlet opening, a screen in said body intermediate its ends, agitators in the body above and below said screen, and means for injecting air into the body above and below said screen.

4. A sifter comprising an open-ended body, closures for the open ends of said body each formed with an air outlet opening, cones extending inwardly from said closures about the openings and having perforated ends, screening carried by said cones and extending across the perforations, a screen in said body intermediate its ends, agitators in said body above and below said screen, and means for injecting air into said body above and below said screen.

5. A sifter comprising an open-ended hollow body, closures for the ends of said body, a screen in said body intermediate its ends, a driven shaft rotatably mounted in said body and extending longitudinally thereof through said screen, agitators carried by said shaft at opposite sides of said screen, a drive shaft extending transversely through said body and having a portion projecting outwardly from the body and provided with turning means, and means for transmitting rotary movement from said drive shaft to said driven shaft.

6. A sifter comprising an open-ended hollow body, closures for the ends of said body, a screen in said body intermediate its ends, a driven shaft rotatably mounted in said body and extending longitudinally thereof through said screen, agitators carried by said shaft at opposite sides of said screen, a drive shaft extending transversely through said body and having a portion projecting outwardly from the body and provided with turning means, means for transmitting rotary movement from said drive shaft to said driven shaft, and a blower actuated from said drive shaft and adapted to direct an air blast into said body in operative relation to said screen.

7. A sifter comprising an open-ended hollow body, closures for the ends of said body, a screen in said body intermediate its ends, a driven shaft rotatably mounted in said body and extending longitudinally thereof through said screen, agitators carried by said shaft at opposite sides of said screen, a drive shaft extending transversely through said body and having a portion projecting outwardly from the body and provided with turning means, means for transmitting rotary movement from said drive shaft to said driven shaft, and blowers actuated from said drive shaft and adapted to direct air blasts into said body above and below said screen.

8. A sifter comprising an open-ended hollow body, closures for the ends of said body, a screen in said body intermediate its ends, a driven shaft rotatably mounted in said body and extending longitudinally thereof through said screen, agitators carried by said shaft at opposite sides of said screen, a drive shaft extending transversely through said body and having a portion projecting outwardly from the body and provided with turning means, means for transmitting rotary movement from said drive shaft to said driven shaft, blower housings carried by said body and provided with outlets registering with openings in said body above and below said screen, blowers in said housings for directing air blasts through the openings into said body to aerate material being screened, and means for actuating said blowers from said drive shaft.

9. A sifter comprising an open-ended hollow body, closures for the ends of said body, a screen in said body intermediate its ends, a driven shaft rotatably mounted in said body and extending longitudinally thereof through said screen, agitators carried by said shaft at opposite sides of said screen, a drive shaft extending transversely through said body and having a portion projecting outwardly from the body and provided with turning means, means for transmitting rotary movement from said drive shaft to said driven shaft, blower housings carried by said body and provided with outlets registering with openings in said body above and below said screen, shafts journaled in said housings and projecting externally thereof towards said drive shaft, fan blades carried by the last-mentioned shafts within said housing for directing air through the openings into said body, and means for rotating said fan shafts from said drive shaft.

In testimony whereof I affix my signature.

LILLIAN E. LOVEJOY. [L. S.]